United States Patent
Nah et al.

(10) Patent No.: US 9,955,026 B2
(45) Date of Patent: Apr. 24, 2018

(54) SHARING DATA AND POINTS WITH GROUP MEMBERS

(71) Applicant: KT CORPORATION, Gyeonggi-do (KR)

(72) Inventors: Bum-Soo Nah, Seoul (KR); Seung-Kyoo Kang, Seoul (KR); Ill-Kyun Jeon, Seoul (KR); Han-Eol Chae, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/167,335

(22) Filed: May 27, 2016

(65) Prior Publication Data
US 2016/0352923 A1    Dec. 1, 2016

(30) Foreign Application Priority Data
May 27, 2015  (KR) .......................... 10-2015-0073941

(51) Int. Cl.
| | | |
|---|---|---|
| H04M 15/00 | (2006.01) | |
| H04W 4/24 | (2009.01) | |
| H04W 4/06 | (2009.01) | |

(52) U.S. Cl.
CPC ... *H04M 15/7652* (2013.01); *H04M 15/8214* (2013.01); *H04W 4/06* (2013.01); *H04W 4/24* (2013.01)

(58) Field of Classification Search
CPC .. H04M 15/46; H04M 15/61; H04M 15/7652; H04M 15/765
See application file for complete search history.

(56) References Cited

U.S. PATENT DOCUMENTS

| | | |
|---|---|---|
| 2008/0119162 A1 | 5/2008 | Sivalingam et al. |
| 2016/0261473 A1* | 9/2016 | Gupta ..................... H04W 4/06 |

FOREIGN PATENT DOCUMENTS

| | | |
|---|---|---|
| KR | 10-2011-0022172 A | 3/2011 |
| KR | 10-1075988 B1 | 10/2011 |
| KR | 10-2014-0012826 A | 2/2014 |
| KR | 10-2015-0005373 A | 1/2015 |

* cited by examiner

*Primary Examiner* — Nam Huynh
(74) *Attorney, Agent, or Firm* — IP Legal Services, LLC

(57) ABSTRACT

The disclosure is related a method for providing, by a server, a sharing service that enables a plurality of user equipments to share at least one of digital assets. The method may include generating a sharing group for virtually linking a first user equipment with a second user equipment in response to a grouping request message from the first user equipment, creating a virtual data sharing storage in association with the generated sharing group in order to virtually store a predetermined amount of sharing data allowance, in response to a data depositing message from the first user equipment, depositing a first amount of data allowance into the virtual data sharing storage for sharing the first amount of data allowance belonging to the first user equipment with the second user equipment virtually linked to the first user equipment as the same sharing group, and in response to a data withdrawing message from the second user equipment, withdrawing a second amount of data allowance from the sharing data allowance stored in the virtual data sharing storage for using the second amount of the sharing data allowance by the second user equipment.

18 Claims, 11 Drawing Sheets

SHARING DATA AND POINTS WITH GROUP MEMBERS

CROSS REFERENCE TO PRIOR APPLICATIONS

The present application claims priority under 35 U.S.C. § 119 to Korean Patent Application No. 10-2015-0073941 (filed on May 27, 2015).

BACKGROUND

The present disclosure relates to communication and, more particularly, to enabling a subscriber to share data, points, and benefits with designated members.

Lately, various mobile devices have been commonly and frequently used in a daily life for searching information, reading news, watching movies, and listening music by downloading related data from associated servers through telecommunications networks in real time. Accordingly, each individual consumes a huge amount of data in a daily life.

Typically, a communication service provider monitors an amount of data packets consumed by each individual and charges the individual based on a data service plan that the individual has and the consumed data amount. Each data service plan commonly includes a predetermined amount of data allowance (e.g., data allotment) that enables an individual to use data without charging. When an individual uses more than the data allowance amount, the communication service provider charges the individual in proportional to an overflowing amount. However, one might use less than associated data allowance while the others use more than associated data allowance. Such a remaining amount is commonly expired after a predetermined time period (e.g., one month).

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present disclosure overcome the above disadvantages and other disadvantages not described above. Also, the embodiments of the present disclosure are not required to overcome the disadvantages described above, and embodiments of the present disclosure may not overcome any of the problems described above.

In accordance with an aspect of the present embodiment, a subscriber may be enabled to share at least one of data allowance, reward points, and membership benefits with the other subscribers in the same group.

In accordance with at least one embodiment, a method may be provided for providing, by a server, a sharing service that enables a plurality of user equipments to share at least one of digital assets. The method may include generating a sharing group for virtually linking a first user equipment with a second user equipment in response to a grouping request message from the first user equipment, creating a virtual data sharing storage in association with the generated sharing group in order to virtually store a predetermined amount of sharing data allowance, in response to a data depositing message from the first user equipment, depositing a first amount of data allowance into the virtual data sharing storage for sharing the first amount of data allowance belonging to the first user equipment with the second user equipment virtually linked to the first user equipment as the same sharing group, and in response to a data withdrawing message from the second user equipment, withdrawing a second amount of data allowance from the sharing data allowance stored in the virtual data sharing storage for using the second amount of the sharing data allowance by the second user equipment.

The depositing may include subtracting the first amount of data allowance from a remaining data allowance of the first user equipment and adding the first amount of data allowance to the sharing data allowance of the virtual data sharing storage.

The withdrawing may include adding the second amount of data allowance to a remaining data allowance of the second user equipment and subtracting the second amount of data allowance from the sharing data allowance of the virtual data sharing storage.

The first amount of data allowance may be decided by the first user equipment.

The method may further include receiving the grouping request message from the first user equipment, extracting identification information of the first user equipment from the grouping request message, obtaining candidate user equipments each having a predetermined relation with the first user equipment based on the extracted identification information, and providing information on the obtained candidate user equipment, as a candidate list, to the first user equipment.

The generating a sharing group may include transmitting, by the server, an invitation message to the candidate user equipments in order to ask them to join the sharing group.

The invitation message may be transmitted through a predetermined messenger server using application programming interface (API) linkage.

The method may further include, in response to a request from the first user equipment, transmitting a data pestering message to the second user equipments included in the same sharing group in order to ask the second user equipment to deposit a predetermined amount of data allowance to the virtual data sharing storage.

The method may further include depositing, by the server, a predetermined amount of data allowance into the virtual data sharing storage upon generation of a predetermined event.

The method may further include creating a virtual point sharing storage in association with the generated sharing group in order to virtually store a predetermined amount of sharing reward points for sharing the sharing reward points with user equipments in the same sharing group.

The method may further include, in response to a point depositing message from the first user equipment, depositing a first amount of reward points into the virtual point sharing storage for sharing the first amount of reward points belonging to the first user equipment with the second user equipment virtually linked to the first user equipment as the same sharing group, and in response to a point withdrawing message from the second user equipment, withdrawing a second amount of reward points from the sharing reward points stored in the virtual point sharing storage for using the second amount of the sharing reward points by the second user equipment.

The depositing may include subtracting the first amount of reward points from remaining reward points of the first user equipment and adding the first amount of reward points to the sharing reward points of the virtual point sharing storage.

The withdrawing may include adding the second amount of reward points to remaining reward points of the second user equipment and subtracting the second amount of reward points from the sharing reward points of the virtual data sharing storage The method may further include creating a virtual benefit sharing storage for sharing membership benefits with user equipments included in a same sharing group.

The method may further include, in response to a benefit depositing message from the first user equipment, depositing a first type of membership benefit into the virtual benefit sharing storage for sharing the first type of membership benefit belonging to the first user equipment with the second user equipment virtually linked to the first user equipment as the same sharing group, and in response to a benefit withdrawing message from the second user equipment, withdrawing a second type of membership benefit from the sharing membership benefits stored in the virtual benefit sharing storage for using the second type of the sharing membership benefit by the second user equipment.

The depositing may include eliminating the first type of membership benefit from remaining membership benefits of the first user equipment and adding the first type of membership benefit to the virtual benefit sharing storage.

The withdrawing may include adding the second type of membership benefit to remaining membership benefits of the second user equipment and eliminating the second type of membership benefit from the sharing membership benefits of the virtual benefit sharing storage.

In accordance with another embodiment, a server may be provided for providing a sharing service that enables a plurality of user equipments to share at least one of digital assets. The server may include a communication circuit configured to communicate with the plurality of user equipments including a first user equipment and a second user equipment, a memory configured to store information and data generated as a result of performing operations for providing the sharing service, and a processor. The processing may be configured to i) generate a sharing group for virtually linking a first user equipment with a second user equipment in response to a grouping request message from the first user equipment, ii) create a virtual data sharing storage in association with the generated sharing group in order to virtually store a predetermined amount of sharing data allowance, iii) in response to a data depositing message from the first user equipment, deposit a first amount of data allowance into the virtual data sharing storage for sharing the first amount of data allowance belonging to the first user equipment with the second user equipment virtually linked to the first user equipment as the same sharing group, and iv) in response to a data withdrawing message from the second user equipment, withdraw a second amount of data allowance from the sharing data allowance stored in the virtual data sharing storage for using the second amount of the sharing data allowance by the second user equipment.

The processor may be configured to create a virtual point sharing storage in association with the generated sharing group in order to virtually store a predetermined amount of sharing reward points for sharing the sharing reward points with user equipments in the same sharing group, in response to a point depositing message from the first user equipment, deposit a first amount of reward points into the virtual point sharing storage for sharing the first amount of reward points belonging to the first user equipment with the second user equipment virtually linked to the first user equipment as the same sharing group, and in response to a point withdrawing message from the second user equipment, withdraw a second amount of reward points from the sharing reward points stored in the virtual point sharing storage for using the second amount of the sharing reward points by the second user equipment.

The processor may be configured to create a virtual benefit sharing storage for sharing membership benefits with user equipments included in a same sharing group, in response to a benefit depositing message from the first user equipment, deposit a first type of membership benefit into the virtual benefit sharing storage for sharing the first type of membership benefit belonging to the first user equipment with the second user equipment virtually linked to the first user equipment as the same sharing group, and in response to a benefit withdrawing message from the second user equipment, withdraw a second type of membership benefit from the sharing membership benefits stored in the virtual benefit sharing storage for using the second type of the sharing membership benefit by the second user equipment.

BRIEF DESCRIPTION OF THE DRAWINGS

The above and/or other aspects of some embodiments of the present invention will become apparent and more readily appreciated from the following description of embodiments, taken in conjunction with the accompanying drawings, of which.

DETAILED DESCRIPTION OF EMBODIMENTS

Figure 1:
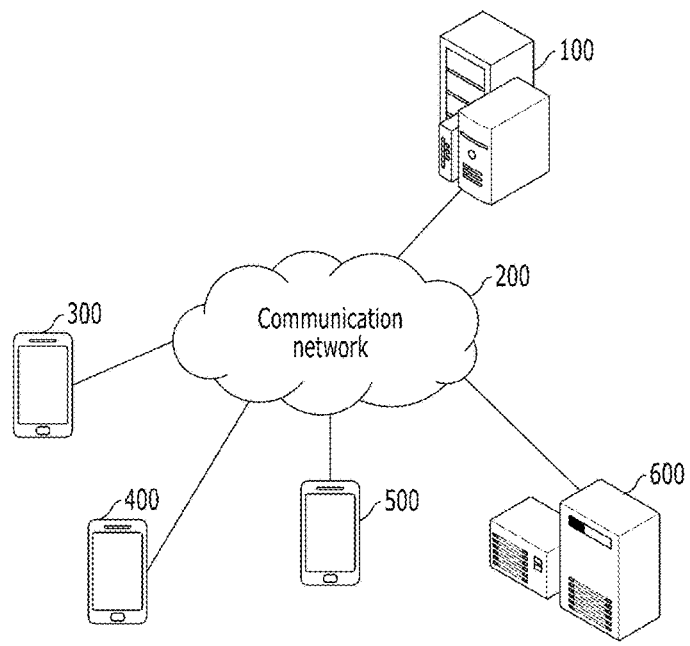
FIG. 1 is an overall view for describing a service for enabling a registered service member to share at least one of a data allowance amount, reward points, and digital coupons in accordance with at least one embodiment.

Reference will now be made in detail to exemplary embodiments of the present invention, examples of which are illustrated in the accompanying drawings, wherein like reference numerals refer to like elements throughout. The embodiments are described below, in order to explain embodiments of the present invention by referring to the figures.

In accordance with at least one embodiment, a service server may provide a service for enabling a registered member to share at least one of a data allowance amount, reward points, and membership benefits (e.g., digital coupons). Such a service may be provided through a predetermined application (e.g., app) installed in and executed by associated user equipment (e.g., smart phone) based on user inputs entered to the user equipment. In response to user inputs, the executed application may access the service server, exchange related information between the service server and the user equipment, provide dedicated graphic user interfaces to enable sharing at least one of a data allowance amount, reward points, and membership benefits (e.g., digital coupons) in accordance with at least one embodiment. Hereinafter, such a service for enabling a registered member to share at least one of a data allowance amount, points, and benefits in accordance with at least one embodiment will be described with reference to FIG. 1.

FIG. 1 is an overall view for describing a service for enabling a registered service member to share at least one of a data allowance amount, reward points, and digital coupons (e.g., membership benefits) in accordance with at least one embodiment. Referring to FIG. 1, such a service may be provided by service server 100 to a plurality of user equipments 300, 400, and 500 through predetermined communication network 200. Furthermore, service server 100 may cooperate with other servers (e.g., server 600 that provides membership benefits and reward points) to provide such a sharing service for sharing a data allowance, digital coupons, or reward points in accordance with at least one embodiment.

User equipments 300, 400, and 500 may be a mobile communication device capable of communicating with others through wired or wireless telecommunication network. For example, user equipments 300, 400, and 500 may be a mobile device coupled to a telecommunication network through various types of communication, such as wireless broadband (WiBro), wideband code division multiple access (WCDMA), code division multiple access (CDMA), long term evolution (LTE). User equipments 300, 400, and 500 may include various types of hand-held device including a smart phone, a table personal computer (PC), a laptop computer, a personal digital assistant (PDA), and so forth.

Such user equipments 300, 400, and 500 may be registered at a communication service provider associated with service server 100 for various types of communication services, such as a voice call service, a text message service, and a data service. Upon registration, user equipment 300 may be assigned with a service plan which is selected by an associated user. For example, when a user registers associated user equipment (e.g., 300) at a predetermined communication service provider (e.g., AT&T® or Verizon®), the user may choose one of service plans that the communication service provider offers. Such service plans may include a basic plan and a value plan (e.g., discount plan or bundle plan). When a user chooses the basic plan, the communication service provider charges the user based on an amount of data packets consumed by associated user equipment without giving a predetermined amount of data allowance, for example, 5 GB of data allowance. The data allowance denotes a predetermined amount of data can be used without being charged. However, when a user consumes data more than the data allowance, a service provider usually charge the user at a higher rate. Furthermore, when a user consumes a data amount less than a predetermined data allowance, such a remaining data may be expired after one billing period. Hereinafter, such a data allowance may be referred to as data allotment or data for convenience.

In order to promote a predetermined product or service, a communication service provider commonly provides reward points and membership benefits to subscribers. The reward points may be regularly provided to subscribers or upon a specific event. A subscriber may use such reward points as cash to buy some products from a designated online and/or offline shopping mall, tickets of movie theaters, coffee shop, restaurants, or pay a communication service fee for an associated communication service. Hereinafter, the reward points may be referred to as points for convenience of description.

The membership benefits are also regularly provided to subscribers or upon a specific event. Like the reward points, such membership benefits may be used at designated online shopping malls, offline shopping malls, movie theaters, coffee shop, restaurants, or a communication service fee for an associated communication service. However, membership benefits may be similar to digital coupons that can be redeemed for a financial discount or rebate when purchasing a product or a service. For example, the membership benefits may be a digital coupon for free Wi-Fi® for a certain time period, a digital coupon for discounting a communication service fee at 30%, a bonus point coupon (e.g., 1,000 points), or a bonus data coupon (e.g., 1 giga bytes (GB) of data). Such benefit may be provided to each subscriber regularly or at a specific promotion event. Hereinafter, such membership benefits may be referred to as benefits or digital coupons for convenience of description.

Since user equipments 300, 400, and 500 are subscribers of a predetermined communication service provider, user equipments 300, 400, and 500 also have rewards points, membership benefits, and data allowances.

In accordance with at least one embodiment, service server 100 may provide a sharing service for enabling user equipments 300, 400, and 500 to create a sharing group with other user equipments and to share such data allowance, reward points, and membership benefits with other user equipments in the same sharing group.

In accordance with at least one embodiment, service server 100 may be a computing system for performing operations to provide such a sharing service to user equipments 300, 400, and 500 through communication network 200. For example, service server 100 may be a billing server (e.g., account server) of an associated communication service provider for monitoring an amount of data packets consumed by each user equipment and charge the user equipment based on an associated service plan and the consumed data amount. However, the embodiments of the present disclosure are not limited thereto. For example, service server 100 may be an independent server separated from a billing server of an associated communication service provider. In this case, service server 100 may cooperate with the billing server to provide the sharing service to user equipments 300, 400, and 500.

As described, service server 100 may perform various operations for providing a data and benefit sharing service to registered user equipments in accordance with at least one embodiment. For example, service server 100 may provide a service-dedicated application to user equipments for the data and benefit sharing service. For example, user equipment 300 may access service server 100 through a web site of service server 100 and request a dedicated application (e.g., App) for the data and benefit sharing service. In response to such a request, service server 100 may transmit such a dedicated application that enables user equipment 300 to register for the data and benefit sharing service and to interact with service server 100 to use the data and benefit sharing service. Alternatively, user equipment 300 may download such a dedicated application through a certain database, such as App Store®, google Store®, and so forth.

After receiving or downloading such application, user equipment 300 may install and execute the installed application in response to a user input. Upon execution, dedicated graphic user interfaces may be generated and displayed on user equipment 300 to enable interaction with service server 100 for performing various operations, such as generating a sharing group, managing a sharing data amount, requesting other members to share data, and so forth. For example, FIG. 7 to FIG. 12 illustrate various exemplary graphic user interfaces for enabling user equipment 300 to interact with service server 100 to share data allowance, points, and benefit with other group members in accordance with at least one embodiment.

In particular, service server 100 may perform operations for grouping a plurality of user equipments as a sharing group in response to a request from at least one of user equipments in accordance with at least one embodiment. Such a grouping operation may group a plurality of user equipments selected by an associated subscriber or having a particular relation therebetween for sharing data, points, and benefits. The particular relation may be family members, friends using the same communication service provider, company colleagues using a bundle service plan offered by the same communication service provider, and so forth.

For example, service server 100 may generate a sharing group in response to a group request, at least two group requests, or a group request from one user equipment with joining requests from the others. Such a group generation request or joining request may be generated in response to a user input through a dedicated graphic user interface displayed on user equipment 300.

Upon receipt of the group generation request, service 100 may determine whether the received group generation request satisfies predetermined group generation policies and generate a sharing group for user equipment (e.g., 300) if the request satisfies the group generation policies. When the request satisfies the group generation polices, service server 100 may determine candidate user equipments and provide information on the determined candidate user equipments to user equipment 300 (e.g., group generation requester) through a dedicated graphic user interface displayed on user equipment 300.

For example, service server 100 may generate a sharing group based on predetermined polices (e.g., rules or conditions). Such predetermined polices may be designed by a service provider, a system designer, or a user, but the present embodiment is not limited thereto. Such predetermined polices may include that i) at least two user equipments need to agree to generate a sharing group, ii) a sharing group has to be generated with any rate plane subscribers under family bundle service; iii) at least 2 members of the family has to be under the same bundle plan to receive benefit; iv) a sharing service will become invalid when the registered lines are below 2 due to termination or service withdrawal (e.g. once the benefit become invalid due to termination or service withdrawal or registered services, Automatic SMS message will be sent to inform other members of the family box about benefit withdrawal.).

After generating a sharing group, service server 100 may perform operations for generating (e.g., defining) a virtual sharing storage for the generated sharing group and managing the virtual sharing storage in connection with the sharing group in response to related activities of the users in the sharing group. For example, such a generated virtual sharing storage (e.g., data box, point box, and benefit box) may be displayed in a graphic user interface of user equipment 300. The generated virtual sharing storage may show an amount of data allowance to share, an amount of points to share, and benefits to share.

The sharable group data amount may be formed by adding data amount donated by each member of the sharing group. For example, each member may donate, as sharing data, a part of or entire amount of data allowance or fee data allotment (e.g., 5 GB per month), which is provided by the service provider based on the service rate plan of each member. Each member of the sharing group is allowed to use a part of or entire amount of the sharable group data. Accordingly, service server 100 may store information on the group sharing data, update and manage the stored information on the group sharing data based on activities associated with the sharing group.

Service server 100 may transmit various types of messages to other user equipments for asking to join a sharing group. For example, service server 100 may transmit a group joining request message to user equipment 400 to join a sharing group, which is included in a candidate list provided from service server 100.

After creating a sharing group and a virtual sharing storage, service server 100 may perform a data sharing operation, a point sharing operation, and a benefit sharing operation using the virtual sharing storage in order to enable members of the sharing group to share at least one of data allowance, points, and benefits with other members in accordance with at last one embodiment. Such operations will be described in later.

In addition, server 600 may be a computing system for providing reward points and membership benefits to associated subscribers (e.g., user equipments 300, 400, and 500) based on a predetermined policy in cooperation with service server 100 in accordance with at least one embodiment. However, the embodiments are not limited thereto. For example, server 600 may be implemented with service server 100 as single server for providing reward points and membership benefits.

As described above, service server 100 may perform operations for providing a sharing service that enables user equipments 300, 400, and 500 to share at least one of data allowance, points, and benefits with other user equipments in the same sharing group in accordance with at least one embodiment. Hereinafter, such service server 100 will be described with reference to FIG. 2.

Figure 2:
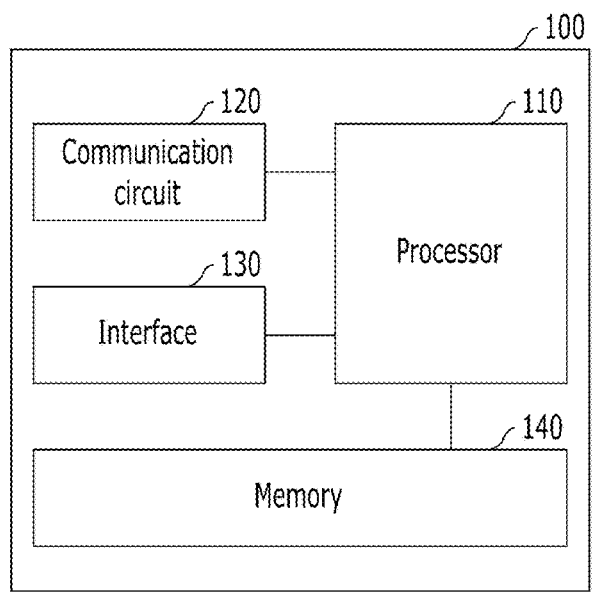
FIG. 2 illustrates a service server for providing a data and points sharing service in accordance with at least one embodiment.

FIG. 2 illustrates a service server for providing a sharing service in accordance with at least one embodiment. Referring to FIG. 2, service server 100 may be a computing system having processing power and communication capability. For example, service server 100 may be a computing system including processor 110, communication circuit 120, interface 130, and memory 140.

Communication circuit 120 may establish a communication link to at least one of user equipments 300, 400, and 500, and server 600 through communication network 200. Through the established link, communication circuit 110 may receive information from or transmit information to at least one of user equipments 300, 400, and 500, and server 600. For example, communication circuit 110 perform communication based on Digital Subscriber Line (xDSL), Hybrid Fiber Coaxial (HFC), Power Line Communication (PLC), satellites, GSM EDGE Radio Access Network (GERAN), UMTS Terrestrial Radio Access Network (UTRAN), evolved UMTS Terrestrial Radio Access Network (eUTRAN), Wireless Local Area Network (WLAN), and Worldwide Interoperability for Microwave Access (Wi-MAX), or a mobile communication network based on CDMA/WCDMA or GSM/GPRS.

In accordance with at least one embodiment, communication circuit 120 may receive a registration request message, a grouping request message, and various messages for depositing, withdrawing, and pestering at least one of data allowance, points, and benefits. Furthermore, communication circuit 120 may transmit information for registration, grouping, a data sharing operation, a point sharing operation, and a benefit sharing operation to user equipments 300, 400, and 500 through communication network 200. Communication circuit 120 may transmit a service-dedicated application to user equipments 300, 400, and 500 through communication network 200.

Communication circuit 120 also exchange information with server 600 for providing and managing reward points and membership benefits. Communication circuit 120 may store the received information in memory 140 or deliver the received information to processor 110 for performing related operations.

Interface 130 may be input/output interface for receiving inputs from an operator and outputting information and results of executing predetermined operations to the operator.

Memory 140 is data storage storing information necessary for driving service server 100 and performing certain operation upon generation of a predetermined event. Such information may include any software programs and related data. Memory 140 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto.

In accordance with at least one embodiment, memory 140 may store information on identification, billing information, account information of each user equipment registered for the sharing service in a form of a mapping table. Furthermore, memory 140 may store information generated during performing a data sharing operation, a point sharing operation and a benefit sharing operation.

Processor 110 may control overall operation of the constituent elements of service server 100. In accordance with at least one embodiment, processor 120 may perform operations for i) registering a user equipment for a sharing service, ii) grouping at least two user equipments as a sharing group in response to a request from at least one user equipment, iii) performing a data sharing operation, iv) performing a point sharing operation, and v) performing a benefit sharing operation. Such operations of service sever 100 will be described in detail with reference to FIG. 3 to FIG. 12.

As described, service server 100 may perform various operations for providing the data and points sharing service to registered user equipments in accordance with at least one embodiment. Hereinafter, such operations of service server 100 will be described with reference to FIG. 3, FIG. 4, FIG. 5, and FIG. 6.

Figure 3:
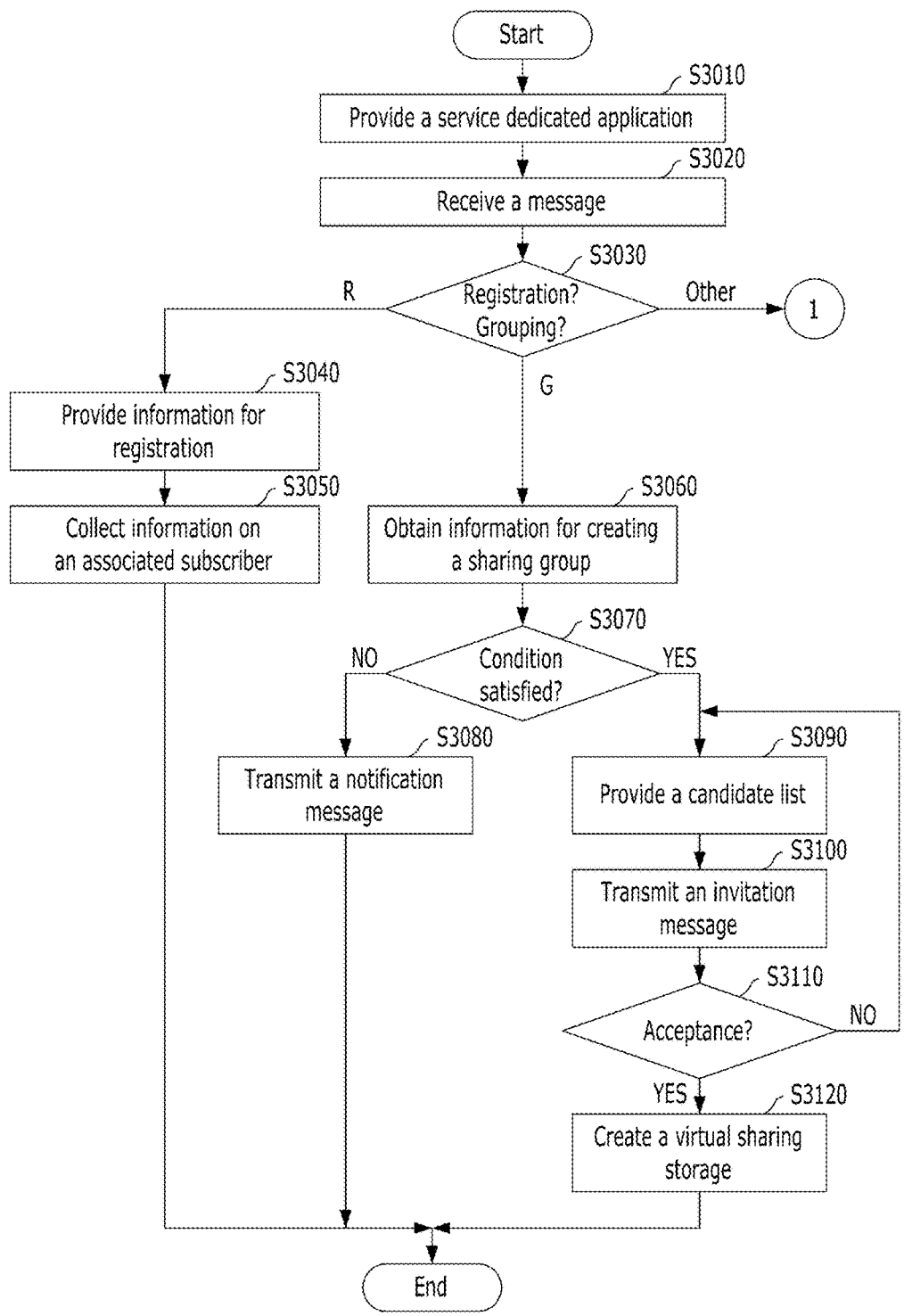
FIG. 3 to FIG. 6 illustrates a method for providing a data and points sharing service by a service server in accordance with at least one embodiment; and FIG. 7 to FIG. 12 illustrates graphic user interfaces displayed on a user equipment to interact with a service server for providing a data and points sharing service in accordance with at least one embodiment.

FIG. 3 to FIG. 6 illustrates a method for providing a data and points sharing service by a service server in accordance with at least one embodiment. FIG. 7 to FIG. 12 illustrates graphic user interfaces displayed on a user equipment to interact with a service server for providing a data and points sharing service in accordance with at least one embodiment. Referring to FIG. 3, a dedicated application for a data and points sharing service may be provided at step S3010. For example, service server 100 may provide the service dedicated application to user equipments that request the data and points sharing service. Such a service dedicated application is software designed to run on various types of computing devices (e.g., a smart phone, a tablet, and a laptop computer) and to perform tasks for providing the data and points sharing service. Such a service dedicated application may include a mobile app, application software, a web application, and so forth. The service dedicated application may be directly provided from service server 100 to user equipments through a communication network in response to a request from the user equipments. Alternatively, the service dedicated application may be indirectly provided through a $3^{rd}$ party online distributor, such as Apple App Store®, Google play Store®, and so forth.

In accordance with at least one embodiment, the service dedicated application may enable user equipments 300 to 500 to interact with service server 100 for utilizing the data and points sharing service. For example, user equipment 300 may i) download the service dedicated application directly or indirectly from service server 100, ii) install the downloaded service dedicated application, iii) generate and display at least one graphic user interface upon initiation of the installed service dedicated application, iv) perform requested tasks based on user inputs received through the graphic user interface, and v) display a task result with the graphic user interface based on the result of performing the requested task. For example, FIG. 7 to FIG. 12 illustrate exemplary graphic user interfaces generated as a result of executing the service-dedicated application installed in user equipment and displayed on the user equipment.

In accordance with at least one embodiment, the service-dedicated application may be provided only to a communication service subscriber associated with service server 100. That is, a service provider of service server 100 may be the same service provider for providing a communication service to a registered member of the data and points sharing service. For example, when a user registers for an associated communication service (AT&T® or Verizon®), the associated communication service provider may provide the service-dedicated application to the subscriber by providing an Internet address (e.g., link) of a database storing the service-dedicated application. In particular, when a user registers for a communication service, a communication service provider may provide i) a predetermined data amount for free data allotment or monthly data allowance and ii) membership benefits (e.g., reward points or digital coupons). Through such a service-dedicated application, the subscribers are enabled to share their free data allotment (e.g., monthly data allowance) and membership benefits.

Figure 7:
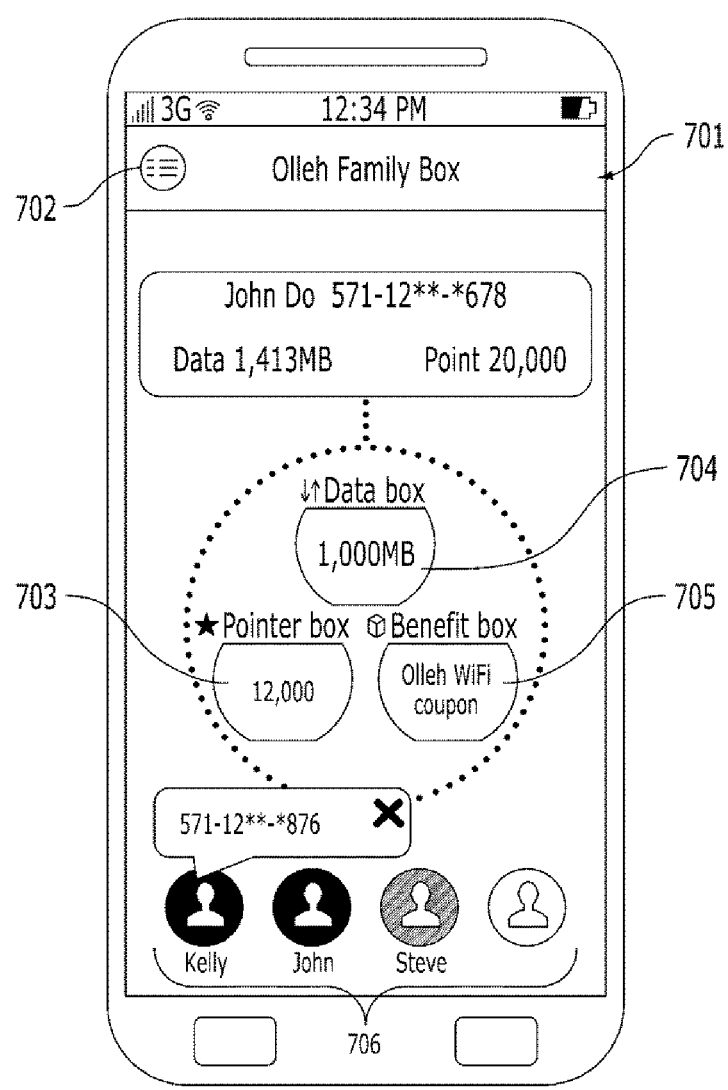

At step S3020, a message may be received from user equipments. For example, service server 100 may receive a message for requesting a certain task from user equipment 300 in accordance with at least one embodiment. Such a message may be generated by user equipment 300 in response to a user input made through the graphic user interface for performing a certain task related to the data and points sharing service. For example, FIG. 7 illustrates a default home interface of the data and points sharing service, which is generated as a result of the service-dedicated application in accordance with at least one embodiment. As shown in FIG. 7, default graphic user interface 701 (e.g., home graphic user interface) may include many icons 703-706 and menus 702 for initiating desired tasks, such as registration for the data and points sharing service, depositing a certain data amount in a virtual data sharing storage (e.g., data box), withdrawing a certain data amount from a virtual data sharing storage (e.g., data box), depositing reward points in a virtual point sharing storage, depositing digital coupons in a virtual coupon sharing storage (e.g., benefit box), and so forth. When a user activates, initiates, or clicks one of menus 702 and icons 703-706, user equipment 300 generates a request message according to the activated menu or icon and transmits the generated request message to service server 703.

At step S3030, determination may be made so as whether the received message is related to registration, grouping, or others (e.g., data sharing, point sharing, benefit sharing). For example, service sever 100 may determine whether the received message is related to registration, grouping, data sharing, points sharing, or benefit sharing. Such a message may include a registration request message, a grouping request message, a group joining request message, a data depositing message, a data withdrawing message, a data pestering message, a point depositing message, a point withdrawing message, a point pestering message, a benefit depositing message, a benefit withdrawing message, a benefit pestering message and so forth. Such a request message may include detailed information on the associated request.

When the received message is the registration message (R-S3030), a registration operation may be performed as follows. At step S3040, information on the data and points sharing service may be provided. For example, service server 100 may provide information on the data and points sharing service to user equipment 300. Such information on the data and points sharing service may include information on what is the data and points sharing service, how to use the data and points sharing service, and so forth. Such information may be transmitted to user equipment 300 and displayed in an associated graphic user interface which is displayed on user equipment 300.

At step S3050, information on user equipment associated with the registration request message may be collected, stored, and managed. For example, service server 100 may collect information on user equipment 300 that requests the registration for the data and points sharing service. In addition, service server 100 may store and manage the collected information in connection with the identification of user equipment 300. That is, service server 100 may i) request creating a user name and a password and ii) request entering necessary information on user equipment 300 for providing the data and points sharing service through a dedicated graphic user interface displayed on user equipment 300. As described, such a dedicated graphic user interface for collecting information may be generated as a result of executing the service-dedicated application installed in user equipment 300. In particular, after creating the user name and the password, service server 100 requests enter identification information (e.g., a subscriber name, an account number for an associated communication service, a telephone number, and so forth) for retrieving supplementary information on a communication service plan (e.g., a data allowance, a charge rate, and so forth).

When the received message is a grouping request message (G-S3030), a grouping operation may be performed as follows. At step S3060, information for creating a sharing group may be obtained based on the grouping request message. For example, service server 100 may extract information included in the received grouping request message or obtain necessary information from own database or other entities based on the information included in the grouping request message. Such a grouping request message may be generated by activating one of menus or icons in default graphic user interface 701. The grouping request message may be generated to include i) information on user equipment 300 transmitting the grouping request message, for example, identification of user equipment 300, a subscribed communication service plan (e.g., value plan, basic plan); ii) information on target subscribers to create a sharing group together, for example, subscribers having a predetermined relation with user equipment 300 (e.g., subscribers grouped in a family plan or grouped in a same company plan, so forth); and iii) information on a target sharing group to join.

At step S3070, determination may be made so as whether an associated grouping request and the associated user equipment are eligible for creating a sharing group based on the obtained information. For example, service server 100 may determine whether user equipment 300 is eligible to create a new sharing group or to join a target sharing group based on the obtained information and predetermined conditions stored in service server 100. Such predetermined conditions for creating a sharing group may be determined by at least one of a system designer and a service provider and stored in an associated database. The predetermined condition for creating a sharing group may be subscribing plans eligible for creating a sharing group. For example, subscribing plans providing a free data allotment (e.g., data allowance) may be an eligible condition for creating a sharing group. In addition, subscribing plans offering grouping discounts may be eligible for creating a sharing group. For example, such subscribing plans may include a family bundle plan, a friend group bundle plan, a company bundle plan, and so forth.

However, embodiments of the present disclosure are not limited to the above described conditions. Such determination may be omitted in another embodiment. For example, user equipment may be allowed to create a sharing group when the user equipment designates other user equipments having subscribing plans offered by the same communication service provider.

When the associated user equipment is not eligible (No-S3070), a notification message may be transmitted to the associated user equipment at step S3080. For example, service server 100 may transmit a notification message to user equipment 300. Such a notification message may include i) a message indicating that user equipment 300 is not eligible for generating the sharing group or for joining a target sharing group and ii) information on a reason why user equipment 300 is not eligible. Through such a message, service server 100 may guide user equipment 300 to subscribe an eligible subscribing plan in order to promote particular products thereof.

Figure 8:
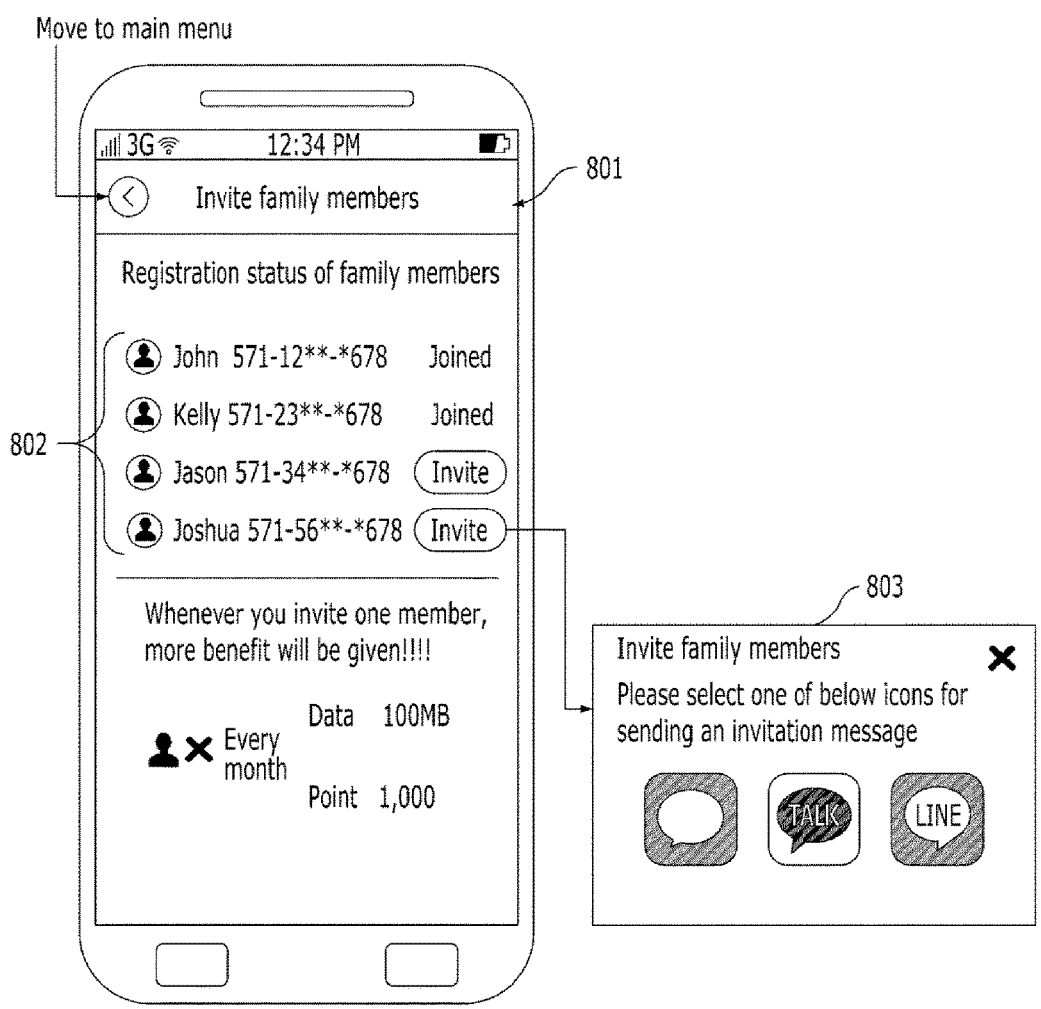

When the associated user equipment is eligible (Yes-S3070), a candidate list may be provided at step S3090. For example, service server 100 may determine subscribers having a particular relation with a subscriber of user equipment 300 and provide information on the determined subscribers as a candidate list to user equipment 300. Such candidate list may be shown in FIG. 8. For example, FIG. 8 illustrates a graphic user interface displayed on user equipment for providing candidate subscribes for creating a sharing group in accordance with at least one embodiment. As shown in FIG. 8, graphic user interface 801 may include information 802 on candidate subscribers eligible to share data with user equipment 300.

Alternatively, when the grouping request message is for joining a target sharing group, a candidate sharing group list may be provided to user equipment 300. When one of the candidate sharing group is selected, service server 100 may join user equipment 300 to the selected sharing group and provide detailed information on the selected sharing group to user equipment 300. Such detailed information on the selected sharing group may be displayed with default graphic user interface 801 in order to enable a user of user equipment 300 to share one of data, points, and benefits through the selected sharing group in accordance with at least one embodiment.

At step S3100, an invitation message may be transmitted to a selected subscriber upon receipt of a selection input for selecting one of the candidate subscribers. For example, Such an invitation message may be transmitted using one of messenger programs installed in user equipment 300.

Such operation may be performed through application programming interface (API) cooperation with an associated messenger server. For example, one of message programs 803 installed user equipment 300 may be displayed on graphic user interface 801 as shown in FIG. 8.

At step S3110, determination may be made so as whether an acceptance message is received. For example, upon receipt of a response message, service server 100 determines whether the response message is the acceptance message or the decline message.

When a decline message is received in response to the invitation message (D-S3110), another candidate list may be provided to user equipment at step S3090.

When an acceptance message is received in response to the invention message (A-S3110), a virtual sharing storage may be created, and detailed information on the created virtual sharing storage may be provided to the associated user equipment at step S8120. For example, upon the receipt of the acceptance message from the selected candidate subscriber, service server 100 may generate (e.g., define) a virtual sharing storage for the generated sharing group. Such a virtual sharing storage may be set of information for sharing data, points, and benefits.

After creating such a virtual sharing storage, service server 100 may add a predetermined amount of data allowance, points, and/or benefits into the created virtual sharing storage, regularly or upon a predetermined event, for example, at every billing cycle (e.g., each month), when a new member is joined to the sharing group.

Referring back to step S3030, operations for managing the virtual sharing storages may be performed when the received request message is not the registration request message and the grouping request message (other-S3030). Hereinafter, as the management operation, a data sharing operation will be described with reference to FIG. 4.

Figure 4:
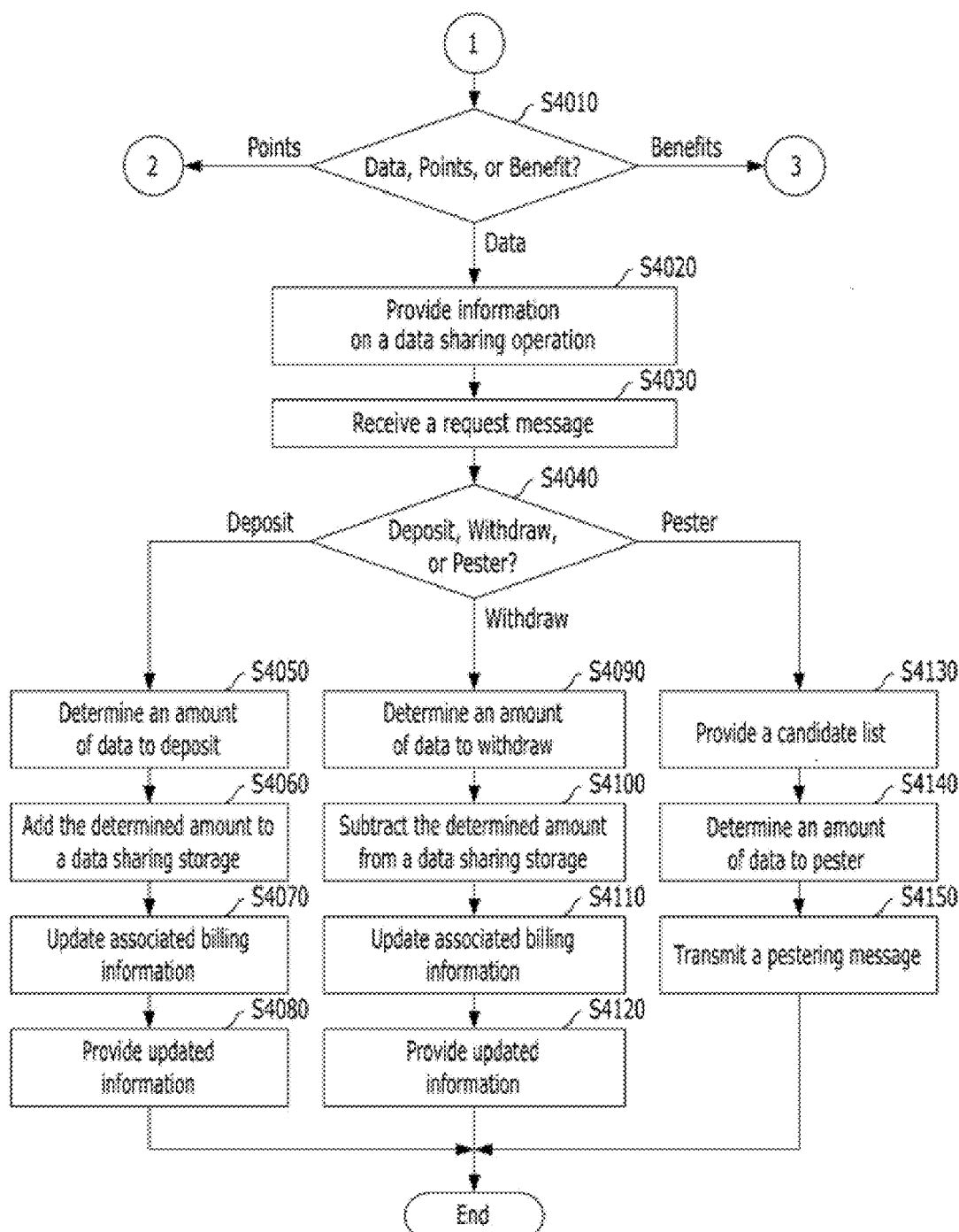
Figure 9:
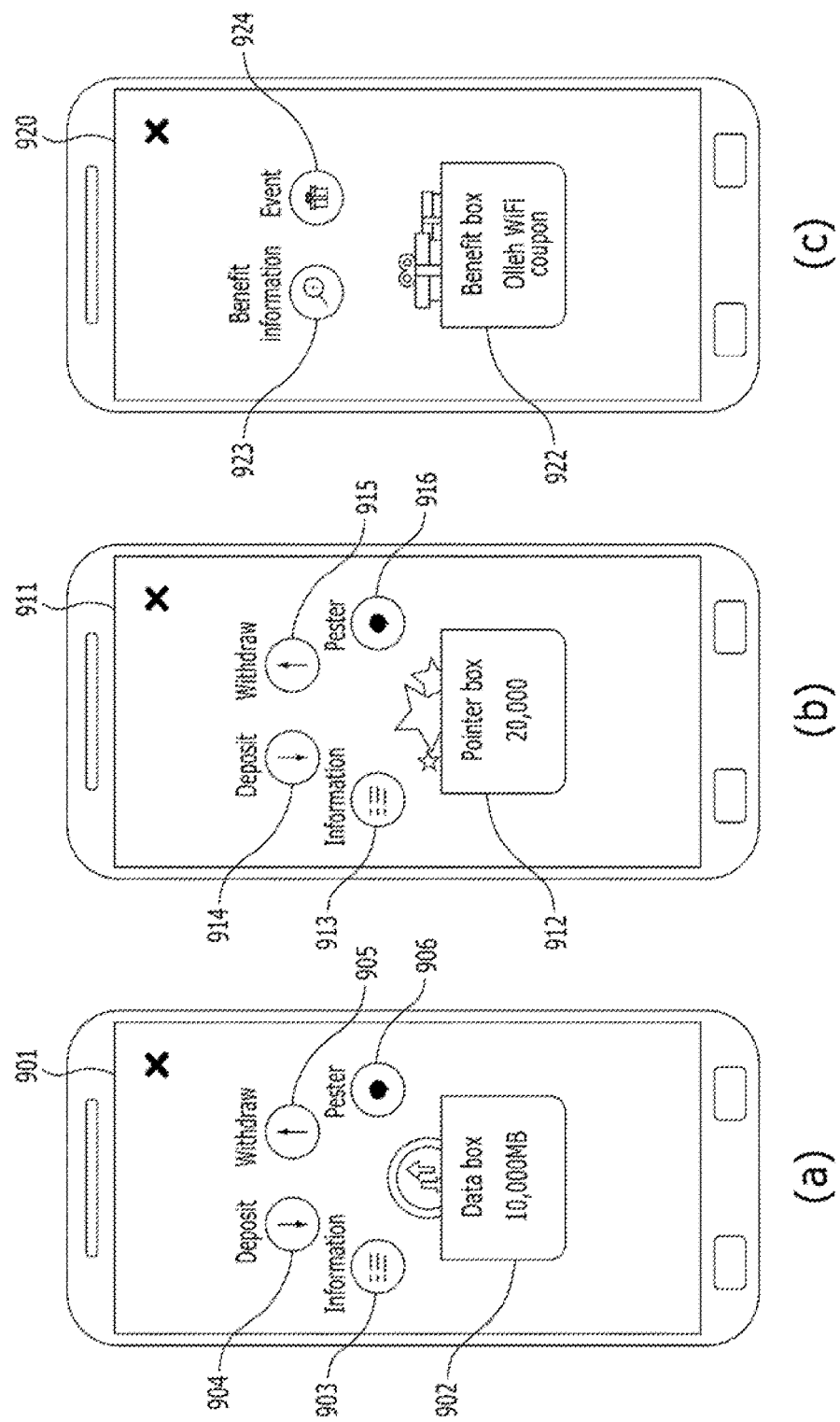
Figure 10:
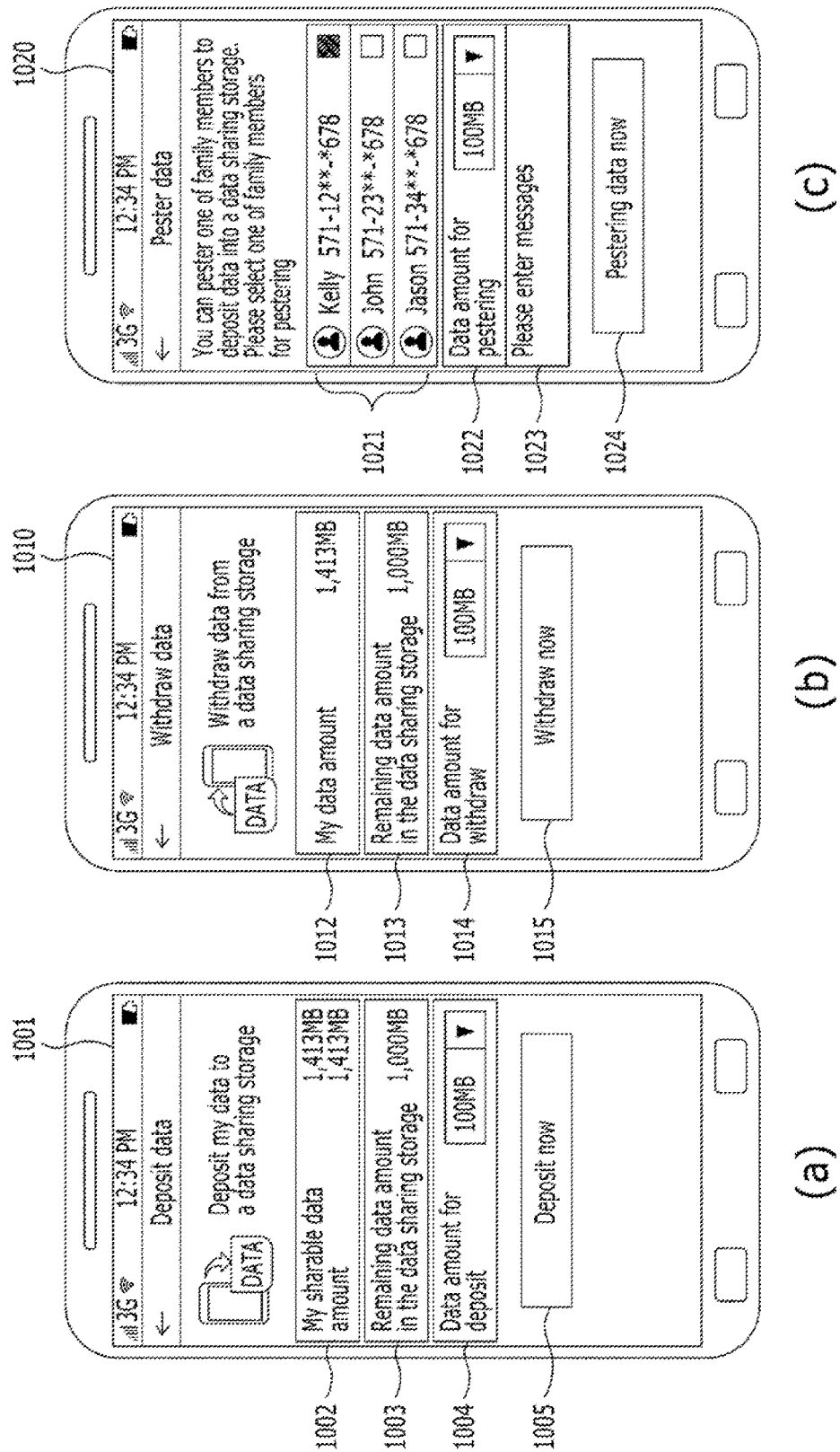

FIG. 4 illustrates a data sharing operation in accordance with at least one embodiment. FIG. 10 illustrates graphic user interfaces related to the data sharing operation in accordance with at least one embodiment As shown in FIG. 4, determination may be made so as whether the received message is related to a data sharing operation, a point sharing operation, or a benefit sharing operation at step S4010. In accordance with at least one embodiment, service server 100 determines whether the received message is related to a data sharing operation, a point sharing operation, or a benefit sharing operation. The data sharing operation, the point sharing operation, or the benefit sharing operation may be initiated by activating or clicking one of icons 703 to 705, as shown in FIG. 7. For example, icon 703 is for initiating the point sharing operation, and icon 704 is for initiating the data sharing operation. In addition, icon 705 is for initiating the benefit sharing operation. When icon 703 is activated, a graphic user interface 901 is displayed on user equipment 300, as shown in FIG. 9.

When the received request message is for the data sharing operation (Data-S4010), information on the data sharing operation may be provided to the associated user equipment at step S4020. For example, service server 100 provides the detailed information on the data sharing operation to user equipment 300. Upon the receipt of the detailed information, user equipment 300 displays the detailed information within a related graphic user interface for the data sharing operation. For example, FIG. 9 illustrates such a graphic user interface for a data sharing operation in accordance with at least one embodiment of the present disclosure. As shown in FIG. 9, such a graphic user interface 901 for the data sharing operation includes icons 903 to 906, respectively assigned with an operation for displaying detailed information, an operation for depositing a predetermined amount of data into the data sharing storage, an operation for withdrawing a predetermined amount of data from the data sharing storage, and an operation for pestering other group member to deposit a predetermined amount data into the data sharing storage. Graphic user interface 901 further includes information box 902 for displaying detailed information on the data sharing storage. For example, the detailed information on the data sharing storage may include a remaining amount of sharing data, such as 10,000 MB or 10 GB. Such detailed information may be updated upon the generation of any activities related to the data sharing storage. In accordance with at least one embodiment, service server 100 may provide such information related to the data sharing operation to user equipment 300 at step S4020. User equipment 300 may display such provided information within information box 902 and uses the provided information to perform other tasks associated with icons 903, 904, 905, and 906.

At step S4030, a request message may be received from the associated user equipment. For example, service server 100 receives a request message from user equipment 300. Such a request message is generated by activating one of icons 904, 905, and 906 in graphic user interface 901, as shown in FIG. 9. Accordingly, the request message includes a data deposit message, a data withdrawal message, and a data pester message.

At step S4040, determination may be made so as whether the received message is related to deposition, withdrawal, or pestering. For example, service server 100 extracts information included in the received request message and determine whether the received request message is a data deposit message, a data withdrawal message, or a data pester message based on the extracted information. Such extracted information may include information on a type of messages (e.g., deposit, withdraw, pester), an amount of data to deposit, withdraw, or pester, a target member to pester, and likes.

When the received message is the data deposit message (Deposit-S4040), an amount of data to deposit may be determined at step S4050. For example, service server 100 determines the amount of data to deposit based on the extracted information in the request message. FIG. 10 illustrates graphic user interfaces for a data sharing operation in accordance with at least one embodiment. Referring to FIG. 10, graphic user interface 1001 may be displayed on user equipment 300 when the data deposit operation is initiated by activating icon 904 of FIG. 9. Through information boxes 1002 and 1003 of graphic user interface 1001, an associated subscriber of user equipment 300 may check an remaining amount of data allotment (e.g., 1,413 MB) and an remaining data amount in the data sharing storage (e.g., 1,000 MB). Furthermore, the associated subscriber of user equipment 300 may decide an amount of data (e.g., 100 MB) to deposit through selection box 1004. After selecting the amount of data to deposit, the data deposit message may be generated to include the information on the decided amount of data to deposit by clicking icon 1005. Accordingly, service server 100 determines the amount of data to deposition based on the information included in the generated data deposit message.

At step S4060, the determined amount of data to deposit may be added to the remaining data amount of the data sharing storage. For example, as shown in FIG. 10, when the remaining data amount of the data sharing storage is 1,000 MB as shown in information box 1003 and the determined amount of data to deposit is 100 MB as shown in selection box 1004, service server 100 adds 100 MB (e.g., the determined deposit data amount) to 1,000 MB (e.g., the remaining data amount of the data sharing storage) and updates the remaining data amount of the data sharing storage to 1,100 MB.

At step S4070, billing information of the associated user equipment may be updated. For example, service server 100 may update the billing information of the associated subscriber of user equipment 300 by subtracting the amount of data to deposit (e.g., 100 MB) from the data allotment and update the billing information of the associated user equipment. In particular, when the associated subscriber's data allotment of each month is 2,000 MB, the amount of data to deposit (e.g. 100 MB) is subtracted from the data allotment (e.g., 2,000 MB). Based on the updated billing information, the associated subscriber is charged at a billing cycle.

At step S4080, updated information may be provided to the associated user equipment. For example, service server 100 provides the updated remaining data amount of the data sharing storage and the updated remaining data amount of the data allotment to user equipment 300. Such update information may be displayed within graphic user interface 1001.

When the received message is the data withdraw message (Withdraw-S4040), an amount of data to withdraw may be determined at step S4090. For example, service server 100 determines the amount of data to withdraw based on the extracted information in the request message. As described, FIG. 10 illustrates graphic user interfaces for a data sharing operation in accordance with at least one embodiment. Referring to FIG. 10, graphic user interface 1010 may be displayed on user equipment 300 when the data withdraw operation is initiated by activating icon 905 of FIG. 9. Through information boxes 1012 and 1013 of graphic user interface 1010, an associated subscriber of user equipment 300 may check an remaining amount of data allotment (e.g., 1,413 MB) and an remaining data amount in the data sharing storage (e.g., 1,000 MB). Furthermore, the associated subscriber of user equipment 300 may decide an amount of data (e.g., 100 MB) to withdraw through selection box 1004. After selecting the amount of data to withdraw, the data withdraw message may be generated to include the information on the decided amount of data to withdraw by clicking icon 1015. Accordingly, service server 100 determines the amount of data to withdraw based on the information included in the generated data withdraw message.

At step S4100, the determined amount of data to withdraw may be subtracted from the remaining data amount of the data sharing storage. For example, as shown in FIG. 10, when the remaining data amount of the data sharing storage is 1,000 MB as shown in information box 1013 and the determined amount of data to withdraw is 100 MB as shown in selection box 1014, service server 100 subtracts 100 MB (e.g., the determined withdraw data amount) from 1,000 MB (e.g., the remaining data amount of the data sharing storage) and updates the remaining data amount of the data sharing storage to 900 MB.

At step S4110, billing information of the associated user equipment may be updated. For example, service server 100 may update the billing information of the associated subscriber of user equipment 300 by adding the amount of data to withdraw (e.g., 100 MB) to the data allotment and update the billing information of the associated user equipment. In particular, when the associated subscriber's data allotment of each month is 2,000 MB, the amount of data to withdraw (e.g. 100 MB) is added to the data allotment (e.g., 2,100 MB). Based on the updated billing information, the associated subscriber is charged at a corresponding billing cycle.

At step S4120, updated information may be provided to the associated user equipment. For example, service server 100 provides the updated remaining data amount of the data sharing storage and the updated remaining data amount of the data allotment to user equipment 300. Such update information may be displayed within graphic user interface 1010.

When the received message is the data pester message (Pester-S4040), necessary information for pestering data (e.g., a candidate list) may be provided at step S4130. For example, service server 100 provides necessary information for pestering data to user equipment 300. Such necessary information may include a candidate list (e.g., group member list) and a remaining amount of data allotment that each member has.

As described, FIG. 10 illustrates graphic user interfaces for a data sharing operation in accordance with at least one embodiment. Referring to FIG. 10, graphic user interface 1020 may be for the data pestering operation. That is, service server 100 provides the necessary information for the data pestering operation based on the information included in the data pester message (e.g., identification of user equipment 300) to user equipment 300. Upon receipt of the necessary information, user equipment 300 displays graphic user interface 1020 including selection box 1021 for displaying the candidate list and selecting one of the candidates, selection box 1022 for selecting an amount of data to pester, message box 1023 for entering a message to the selected candidate, and icon 1024 for requesting pestering.

Through graphic user interface 1020, an associated subscriber of user equipment 300 may select one in the candidate list for pestering data and decide an amount of data (e.g., 100 MB) to pester. Then, information on the selected candidate and the decided amount of data to pester may be transmitted to service server 100.

At step S4140, the decided amount of data to pester and the selected candidate may be determined. For example, based on the received information, service server 100 determines the amount of data to pester and the selected member to pester.

At step S4150, a pestering message may be transmitted to the selected member. For example, service server 100 may generate a pestering message to include the decided amount of data to pester and transmit the generated pestering message to the selected member. However, embodiments of the present disclosure are not limited thereto. For example, user equipment 300 may generate such a pestering message and transmit the generated pestering message to the selected member without passing through service server 100. In this case, user equipment 300 may provide another graphic user interface for enabling an associated subscriber to select one of messaging programs installed in user equipment 300. Upon receipt of input to select one of messaging programs, user equipment 300 may transmit the pestering message in API cooperation.

Referring back to step S4010 of FIG. 4, service server 100 determines whether the received message is related to a data sharing operation, a point sharing operation, or a benefit sharing operation. As described, the data sharing operation, the point sharing operation, or the benefit sharing operation may be initiated by activating or clicking one of icons 703 to 705, as shown in FIG. 7. For example, icon 703 is for initiating the point sharing operation, and icon 704 is for initiating the data sharing operation. In addition, icon 705 is for initiating the benefit sharing operation. When icon 704 is activated, a graphic user interface 910 for the point sharing operation is displayed on user equipment 300, as shown in FIG. 9. Hereinafter, such a point sharing operation will be described with reference to FIG. 5.

Figure 5:
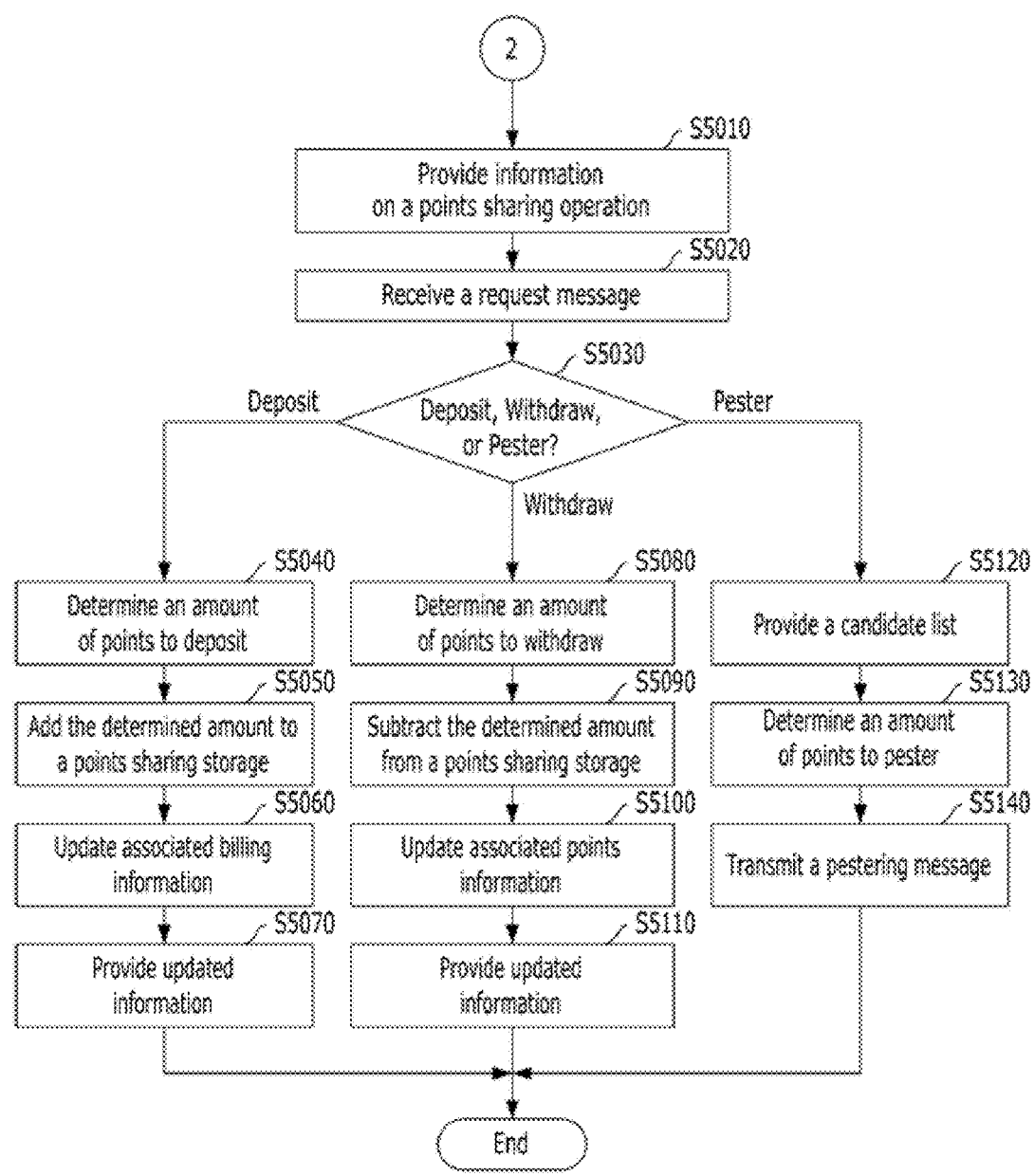
Figure 11:
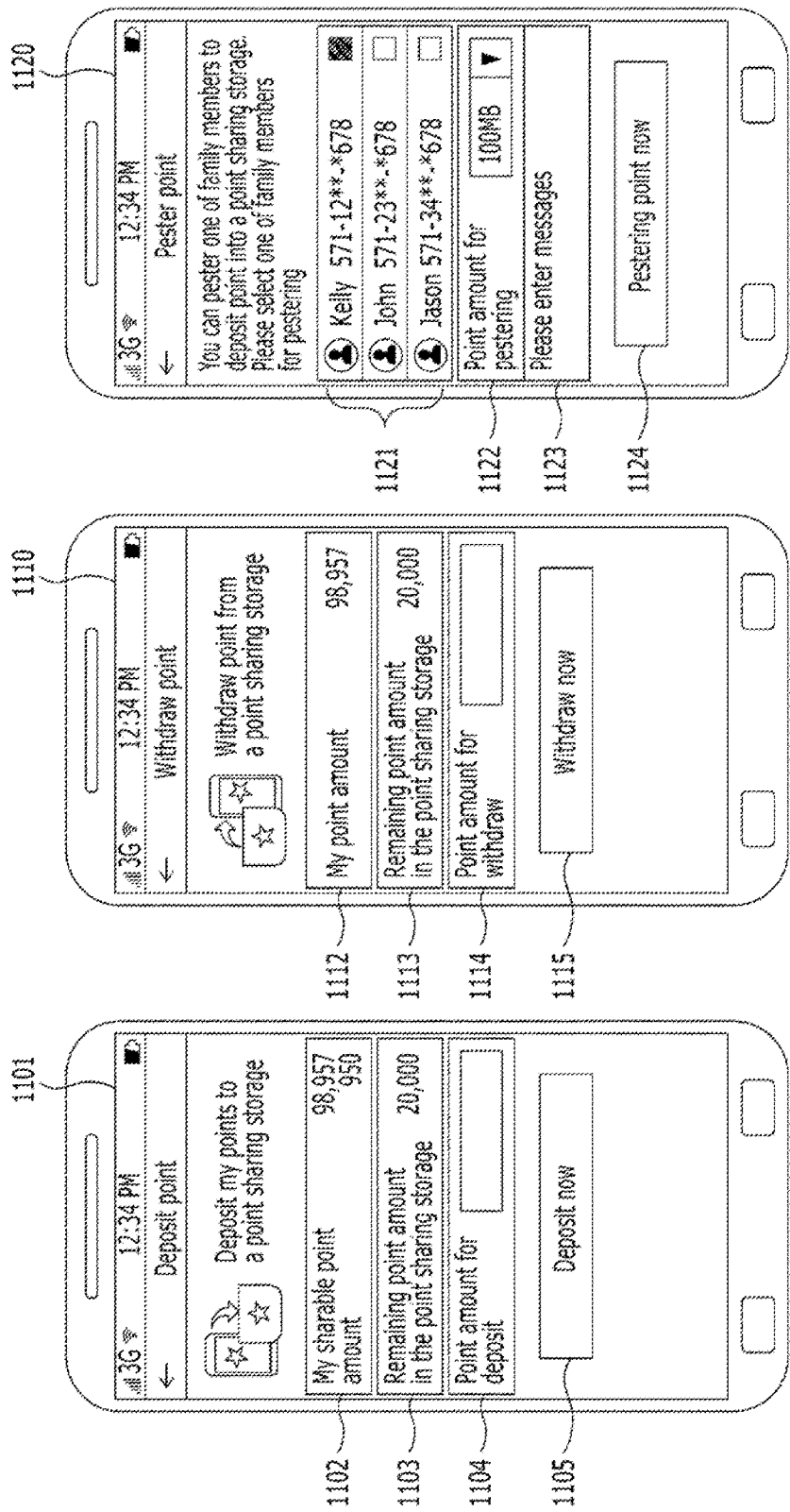

FIG. 5 illustrates a point sharing operation in accordance with at least one embodiment. FIG. 11 illustrates graphic user interfaces related to the point sharing operation in accordance with at least one embodiment. Referring to FIG. 5, when the received request message is for the point sharing operation (Points-S4010), service server 100 provides the detailed information on the point sharing operation to user equipment 300 at step S5010. Upon the receipt of the detailed information, user equipment 300 displays the detailed information within a related graphic user interface for the data sharing operation.

For example, a diagram (b) of FIG. 9 illustrates such a graphic user interface for a point sharing operation in accordance with at least one embodiment of the present disclosure. As shown in FIG. 9, such a graphic user interface 910 for the point sharing operation includes icons 913 to 916, respectively assigned with an operation for displaying detailed information, an operation for depositing a predetermined amount of points into the point sharing storage, an operation for withdrawing a predetermined amount of points from the points sharing storage, and an operation for pestering other group member to deposit a predetermined amount of points into the points sharing storage. Graphic user interface 910 further includes information box 912 for displaying detailed information on the points sharing storage. For example, the detailed information on the points sharing storage may include a remaining amount of sharing points, such as 20,000 points. Such points may be reward points provided by a service provider. A subscriber may use such points as cash to buy some products from a dedicated online shopping mall or pay a bill for an associated communication service. Such detailed information may be updated upon the generation of any activities related to the points sharing storage. In accordance with at least one embodiment, service server 100 may provide such information related to the point sharing operation to user equipment 300 at step S5010. User equipment 300 may display such provided information within information box 912 and uses the provided information to perform other tasks associated with icons 913, 914, 915, and 916.

At step S5020, service server 100 may receive a request message from user equipment 300. Such a request message is generated by activating one of icons 914, 915, and 916 in graphic user interface 910, as shown in FIG. 9. Accordingly, the request message includes a points deposit message, a points withdrawal message, and a points pester message.

At step S5043, service server 100 may extract information included in the received request message and determine whether the received request message is a points deposit message, a points withdrawal message, or a points pester message based on the extracted information. Such extracted information may include information on a type of messages (e.g., deposit, withdraw, pester), an amount of points to deposit, withdraw, or pester, a target member to pester, and likes.

When the received message is the points deposit message (Deposit-S5030), service server 100 determines the amount of points to deposit based on the extracted information in the request message at step S5040. For example, FIG. 11 illustrates graphic user interfaces for a point sharing operation in accordance with at least one embodiment. Referring to FIG. 11, graphic user interface 1101 may be displayed on user equipment 300 when the points deposit operation is initiated by activating icon 914 of FIG. 9. Through information boxes 1102 and 1103 of graphic user interface 1101, an associated subscriber of user equipment 300 may check an remaining amount of points (e.g., 98,957 points) and an remaining points amount in the points sharing storage (e.g., 20,000 points). Furthermore, the associated subscriber of user equipment 300 may decide an amount of points (e.g., 1000) to deposit through selection box 1104. After selecting the amount of points to deposit, the points deposit message may be generated to include the information on the decided amount of points to deposit by clicking icon 1105. Accordingly, service server 100 determines the amount of points to deposit based on the information included in the generated points deposit message.

At step S5050, the determined amount of points to deposit may be added to the remaining points amount of the points sharing storage. For example, as shown in FIG. 11, when the remaining points amount of the points sharing storage is 20,000 as shown in information box 1103 and the determined amount of points to deposit is 1,000 as shown in selection box 1104, service server 100 adds 1,000 (e.g., the determined deposit points amount) to 20,000 (e.g., the remaining points amount of the points sharing storage) and updates the remaining points amount of the points sharing storage to 21,000 points.

At step S5060, points information (e.g., account information) of the associated user equipment may be updated. For example, service server 100 may update the account information of the associated subscriber of user equipment 300 by subtracting the amount of points to deposit (e.g., 1000) from the remaining points amount and update the account information of the associated user equipment.

At step S5070, service server 100 provides the updated remaining points amount of the points sharing storage and the updated remaining points amount to user equipment 300. Such update information may be displayed within graphic user interface 1101 of FIG. 11.

When the received message is the points withdraw message (Withdraw-S5030), service server 100 may determine the amount of points to withdraw based on the extracted information in the request message at step S5080. As shown in FIG. 11, graphic user interface 1110 for the points withdraw operation may be displayed on user equipment 300 when the points withdraw operation is initiated by activating icon 915 of FIG. 9. Through information boxes 1112 and 1113 of graphic user interface 1110, an associated subscriber of user equipment 300 may check an remaining amount of points (e.g., 98,957) and an remaining points amount in the points sharing storage (e.g., 20,000). Furthermore, the associated subscriber of user equipment 300 may decide an amount of points (e.g., 1,000) to withdraw through selection box 1104. After selecting the amount of points to withdraw, the points withdraw message may be generated to include the information on the decided amount of points to withdraw by clicking icon 1115. Accordingly, service server 100 determines the amount of points to withdraw based on the information included in the generated data withdraw message.

At step S5090, the determined amount of data to withdraw may be subtracted from the remaining data amount of the data sharing storage. For example, as shown in FIG. 11, when the remaining points amount of the points sharing storage is 20,000 as shown in information box 1113 and the determined amount of points to withdraw is 1,000 as shown in selection box 1114, service server 100 subtracts 1,000 (e.g., the determined withdraw points amount) from 20,000 (e.g., the remaining points amount of the points sharing storage) and updates the remaining points amount of the points sharing storage to 19,000.

At step S5100, service server 100 may update the points information of the associated subscriber of user equipment 300 by adding the amount of points to withdraw (e.g., 1000) to the remaining points and update the points information of the associated user equipment.

At step S5110, service server 100 may provide the updated remaining points amount of the points sharing storage and the updated remaining points amount to user equipment 300. Such update information may be displayed within graphic user interface 1110.

When the received message is the points pester message (Pester-S5030), service server 100 may provide necessary information for pestering points to user equipment 300 at step S5120. Such necessary information may include a candidate list (e.g., group member list) and a remaining amount of points that each member has.

As described, FIG. 11, graphic user interface 1120 may be for the points pestering operation. That is, service server 100 provides the necessary information for the points pestering operation based on the information included in the points pester message (e.g., identification of user equipment 300) to user equipment 300. Upon receipt of the necessary information, user equipment 300 displays graphic user interface 1120 including selection box 1121 for displaying the candidate list and selecting one of the candidates, selection box 1122 for selecting an amount of points to pester, message box 1023 for entering a message to the selected candidate, and icon 1124 for requesting pestering.

Through graphic user interface 1120, an associated subscriber of user equipment 300 may select one in the candidate list for pestering points and decide an amount of points (e.g., 1,000) to pester. Then, information on the selected candidate and the decided amount of points to pester may be transmitted to service server 100.

At step S5130, based on the received information, service server 100 determines the amount of data to pester and the selected member to pester. At step S5140, service server 100 may generate a pestering message to include the decided amount of points to pester and transmit the generated pestering message to the selected member. However, embodiments of the present disclosure are not limited thereto. For example, user equipment 300 may generate such a pestering message and transmit the generated pestering message to the selected member without passing through service server 100. In this case, user equipment 300 may provide another graphic user interface for enabling an associated subscriber to select one of messaging programs installed in user equipment 300. Upon receipt of input to select one of messaging programs, user equipment 300 may transmit the pestering message in API cooperation.

Hereinafter, such a benefit sharing operation will be described with reference to FIG. 6. Since the benefit sharing operation is very similar to the point sharing operation, the benefit sharing operation will be described briefly.

Figure 6:
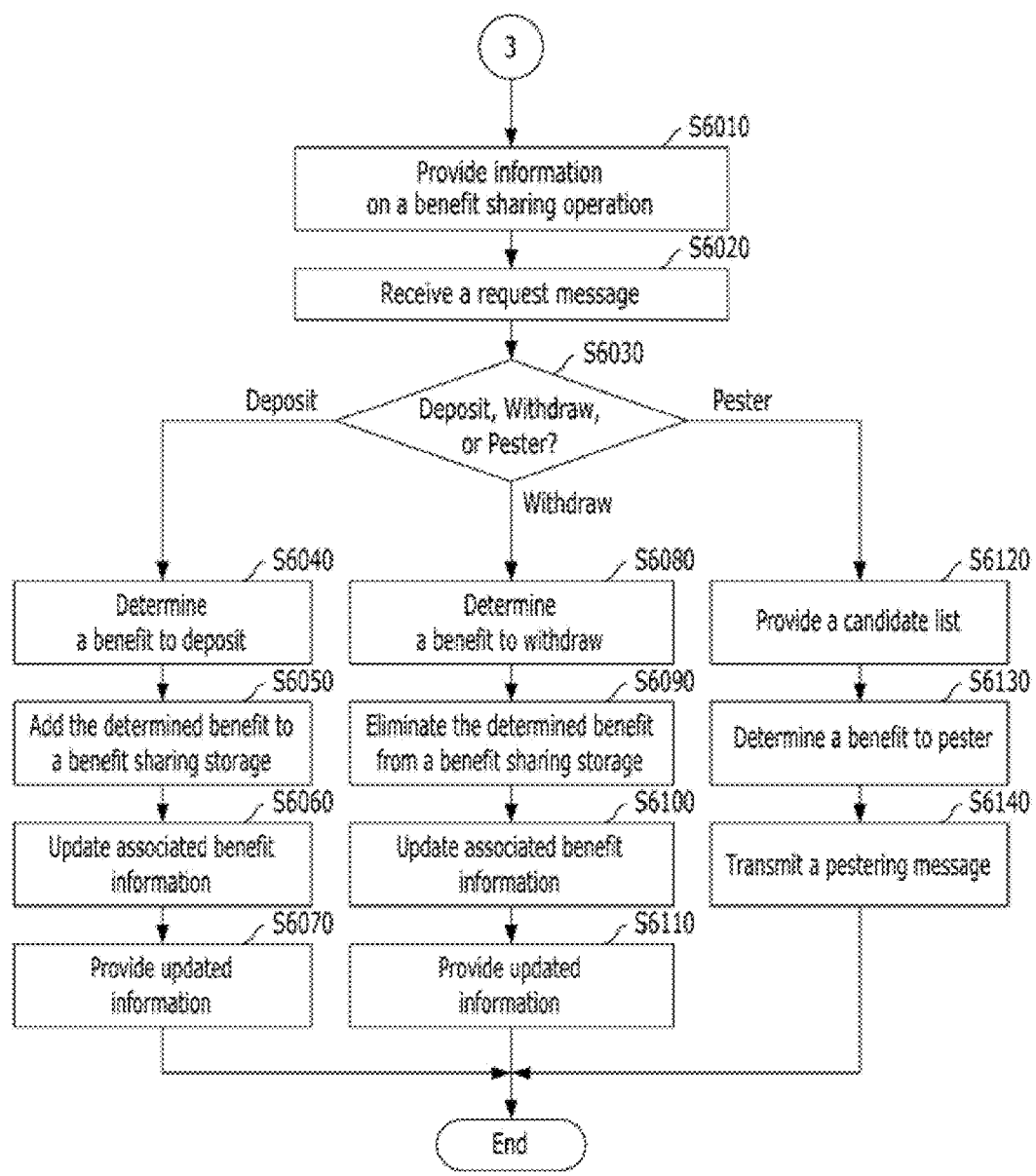

FIG. 6 illustrates a benefit sharing operation in accordance with at least one embodiment. Referring to FIG. 6, when the received request message is for the benefit sharing operation (Benefit-S4010), service server 100 provides the detailed information on the point sharing operation to user equipment 300 at step S6010. At step S6020, service server 100 may receive a request message from user equipment 300. Such a request message is generated by activating one of icons 923 and 924 in graphic user interface 920, as shown in FIG. 9. At step S6030, service server 100 may extract information included in the received request message and determine whether the received request message is a benefit deposit message, a benefit withdrawal message, or a benefit pester message based on the extracted information. Such extracted information may include information on a type of messages (e.g., deposit, withdraw, pester), a type of benefit to deposit, withdraw, or pester, a target member to pester, and likes.

When the received message is the benefit deposit message (Deposit-S6030), service server 100 determines a type of benefit to deposit based on the extracted information in the request message at step S6040. At step S6050, the determined type of benefit to deposit may be added to the benefit sharing storage. At step S6060, service server 100 may update the benefit information of the associated subscriber of user equipment 300 by eliminating the type of benefit to deposit from the remaining benefits and update the account information (e.g., benefit information) of the associated user equipment.

At step S6070, service server 100 provides the updated information of the benefit sharing storage to user equipment 300.

When the received message is the benefit withdraw message (Benefit-S5030), service server 100 may determine a type of benefit to withdraw based on the extracted information in the request message at step S6080. At step S6090, the determined type of benefit to withdraw may be eliminated from the remaining benefits of the benefit sharing storage. At step S6100, service server 100 may update the benefit information of the associated subscriber of user equipment 300 by adding the type of benefit to withdraw to the remaining benefits and update the benefit information (e.g., account information) of the associated user equipment. At step S6110, service server 100 may provide the updated information of the benefit sharing storage to user equipment 300.

When the received message is the benefit pester message (benefit-S5030), service server 100 may provide necessary information for pestering benefit to user equipment 300 at step S6120. Such necessary information may include a candidate list (e.g., group member list) and benefits that each member has. At step S6130, based on the received information, service server 100 determines a type of benefit to pester and the selected member to pester. At step S6140, service server 100 may generate a pestering message to include the decided type of benefit to pester and transmit the generated pestering message to the selected member. However, embodiments of the present disclosure are not limited thereto. For example, user equipment 300 may generate such a pestering message and transmit the generated pestering message to the selected member without passing through service server 100. In this case, user equipment 300 may provide another graphic user interface for enabling an associated subscriber to select one of messaging programs installed in user equipment 300. Upon receipt of input to select one of messaging programs, user equipment 300 may transmit the pestering message in API cooperation.

Figure 12:
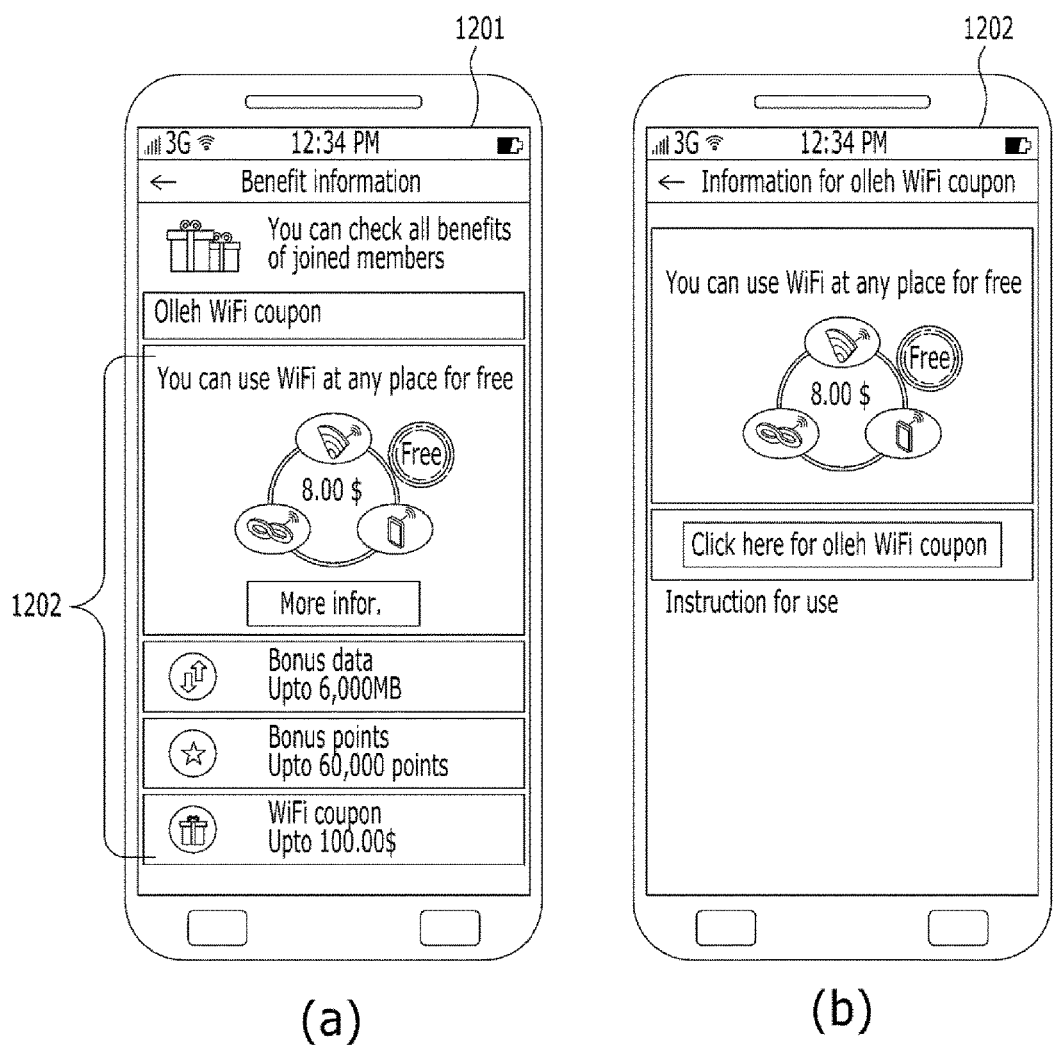

Such a benefit sharing operation may be implemented differently in accordance with another embodiment. A diagram (c) of FIG. 9 and FIG. 12 illustrate graphic user interfaces for a benefit sharing operation in accordance with another embodiment. For example, as shown in a diagram (c) of FIG. 9, graphic user interface 920 for the benefit sharing operation may enable an associated subscriber to share benefits with other members in the same sharing group. Graphic user interface 920 may include icon 923 for checking all benefits of the same sharing group and selecting at least one of the all benefits and icon 924 for checking benefits offered by an associated communication service provider. Furthermore, graphic user interface 920 may include information box 922 for displaying benefits in the benefit sharing storage.

The benefits may be provided by associated service providers as a gift to subscribers. The benefits may be digital coupons that can be redeemed for a financial discount or rebate when purchasing a product or a service. For example, the benefits may be a digital coupon for free WiFi for a certain period, a digital coupon for discounting a communication service fee at 30%, a bonus point coupon (e.g., 1,000 points), or a bonus data coupon (e.g., 1 GB of data). Such benefit may be provided to each subscriber regularly or at a specific promotion event.

When an associated subscriber of user equipment 300 clicks icon 923 in graphic user interface 920 of FIG. 9, user equipment 300 may display graphic user interface 1201 for checking all benefits 1202 of the same sharing group and selecting at least one of the all benefits, as shown in FIG. 12. When an associated subscriber of user equipment 300 clicks icon 924 in graphic user interface 920 of FIG. 9, user equipment 300 may display graphic user interface 1202 for checking benefits offered by an associated communication service provider, as shown in FIG. 12. That is, as shown in FIG. 9 and FIG. 12, the benefit sharing operation may be implemented to enable a subscriber for simply browsing all benefits of the same group and selecting one of the benefits in accordance with another embodiment.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for providing, by a server, a sharing service that enables a plurality of user equipments to share at least one of digital assets, the method comprising:
   receiving a grouping request message from the first user equipment;
   extracting identification information of the first user equipment from the grouping request message;
   obtaining candidate user equipments each having a predetermined relation with the first user equipment based on the extracted identification information; and
   providing information on the obtained candidate user equipment as a candidate list to the first user equipment;
   generating a sharing group for virtually linking a first user equipment with a second user equipment in response to the grouping request message from the first user equipment;
   creating a virtual data sharing storage in association with the generated sharing group in order to virtually store a predetermined amount of sharing data allowance;
   in response to a data depositing message from the first user equipment, depositing a first amount of data allowance into the virtual data sharing storage for sharing the first amount of data allowance belonging to the first user equipment with the second user equipment virtually linked to the first user equipment as the same sharing group; and
   in response to a data withdrawing message from the second user equipment, withdrawing a second amount of data allowance from the sharing data allowance stored in the virtual data sharing storage for using the second amount of the sharing data allowance by the second user equipment.

2. The method of claim 1, wherein the depositing comprises:
   subtracting the first amount of data allowance from a remaining data allowance of the first user equipment and adding the first amount of data allowance to the sharing data allowance of the virtual data sharing storage.

3. The method of claim 1, wherein the withdrawing comprises:
   adding the second amount of data allowance to a remaining data allowance of the second user equipment and subtracting the second amount of data allowance from the sharing data allowance of the virtual data sharing storage.

4. The method of claim 1, wherein the first amount of data allowance is decided by the user equipment.

5. The method of claim 1, wherein the generating a sharing group comprises:
   transmitting, by the server, an invitation message to the candidate user equipments in order to ask them to join the sharing group.

6. The method of claim 5, wherein the invitation message is transmitted through a predetermined messenger server using application programming interface (API) linkage.

7. The method of claim 1, further comprising:
   in response to a request from the first user equipment, transmitting a data pestering message to the second user equipments included in the same sharing group in order to ask the second user equipment to deposit a predetermined amount of data allowance to the virtual data sharing storage.

8. The method of claim 1, further comprising:
   depositing, by the server, a predetermined amount of data allowance into the virtual data sharing storage upon generation of a predetermined event.

9. The method of claim 1, further comprising:
   creating a virtual point sharing storage in association with the generated sharing group in order to virtually store a predetermined amount of sharing reward points for sharing the sharing reward points with user equipments in the same sharing group.

10. The method of claim 9, further comprising:
    in response to a point depositing message from the first user equipment, depositing a first amount of reward points into the virtual point sharing storage for sharing the first amount of reward points belonging to the first user equipment with the second user equipment virtually linked to the first user equipment as the same sharing group; and
    in response to a point withdrawing message from the second user equipment, withdrawing a second amount of reward points from the sharing reward points stored in the virtual point sharing storage for using the second amount of the sharing reward points by the second user equipment.

11. The method of claim 10, wherein the depositing comprises:
    subtracting the first amount of reward points from remaining reward points of the first user equipment and adding the first amount of reward points to the sharing reward points of the virtual point sharing storage.

12. The method of claim 10, wherein the withdrawing comprises:
    adding the second amount of reward points to remaining reward points of the second user equipment and subtracting the second amount of reward points from the sharing reward points of the virtual data sharing storage.

13. The method of claim 1, further comprising:
    creating a virtual benefit sharing storage for sharing membership benefits with user equipments included in a same sharing group.

14. The method of claim 13, further comprising:
    in response to a benefit depositing message from the first user equipment, depositing a first type of membership benefit into the virtual benefit sharing storage for sharing the first type of membership benefit belonging to the first user equipment with the second user equipment virtually linked to the first user equipment as the same sharing group; and
    in response to a benefit withdrawing message from the second user equipment, withdrawing a second type of membership benefit from the sharing membership benefits stored in the virtual benefit sharing storage for using the second type of the sharing membership benefit by the second user equipment.

15. The method of claim 14, wherein the depositing comprises:
    eliminating the first type of membership benefit from remaining membership benefits of the first user equipment and adding the first type of membership benefit to the virtual benefit sharing storage.

16. The method of claim 14, wherein the withdrawing comprises:
    adding the second type of membership benefit to remaining membership benefits of the second user equipment and eliminating the second type of membership benefit from the sharing membership benefits of the virtual benefit sharing storage.

17. A server for providing a sharing service that enables a plurality of user equipments to share at least one of digital assets, the server comprising:
- a communication circuit configured to communicate with the plurality of user equipments including a first user equipment and a second user equipment;
- a memory configured to store information and data generated as a result of performing operations for providing the sharing service; and
- a processing configured to i) generate a sharing group for virtually linking a first user equipment with a second user equipment in response to a grouping request message from the first user equipment, ii) create a virtual data sharing storage in association with the generated sharing group in order to virtually store a predetermined amount of sharing data allowance, iii) in response to a data depositing message from the first user equipment, deposit a first amount of data allowance into the virtual data sharing storage for sharing the first amount of data allowance belonging to the first user equipment with the second user equipment virtually linked to the first user equipment as the same sharing group, iv) in response to a data withdrawing message from the second user equipment, withdraw a second amount of data allowance from the sharing data allowance stored in the virtual data sharing storage for using the second amount of the sharing data allowance by the second user equipment, v) create a virtual point sharing storage in association with the generated sharing group in order to virtually store a predetermined amount of sharing reward points for sharing the sharing reward points with user equipments in the same sharing group, vi) in response to a point depositing message from the first user equipment deposit a first amount of reward points into the virtual point sharing storage for sharing the first amount of reward points belonging to the first user equipment with the second user equipment virtually linked to the first user equipment as the same sharing group, and vii) in response to a point withdrawing message from the second user equipment withdraw a second amount of reward points from the sharing reward points stored in the virtual point sharing storage for using the second amount of the sharing reward points by the second user equipment.

18. The server of claim 17, wherein the processor is configured to:
- create a virtual benefit sharing storage for sharing membership benefits with user equipments included in a same sharing group;
- in response to a benefit depositing message from the first user equipment, deposit a first type of membership benefit into the virtual benefit sharing storage for sharing the first type of membership benefit belonging to the first user equipment with the second user equipment virtually linked to the first user equipment as the same sharing group; and
- in response to a benefit withdrawing message from the second user equipment, withdraw a second type of membership benefit from the sharing membership benefits stored in the virtual benefit sharing storage for using the second type of the sharing membership benefit by the second user equipment.

* * * * *